(12) United States Patent
Stantchev (10) Patent No.: US 11,224,825 B2
(45) Date of Patent: Jan. 18, 2022

(54) SEPARATION SYSTEM AND METHOD THEREOF

(71) Applicant: George Stantchev, Phoenix, AZ (US)

(72) Inventor: George Stantchev, Phoenix, AZ (US)

( * ) Notice: Subject to any disclaimer, the term of this patent is extended or adjusted under 35 U.S.C. 154(b) by 0 days.

(21) Appl. No.: 16/661,297

(22) Filed: Oct. 23, 2019

(65) Prior Publication Data

US 2020/0122054 A1 Apr. 23, 2020

Related U.S. Application Data

(60) Provisional application No. 62/749,597, filed on Oct. 23, 2018.

(51) Int. Cl.
| | | |
|---|---|---|
| *B01D 3/34* | (2006.01) | |
| *B01D 1/00* | (2006.01) | |
| *B01D 5/00* | (2006.01) | |
| *B01D 3/42* | (2006.01) | |
| *G01N 30/86* | (2006.01) | |
| *G01N 30/02* | (2006.01) | |

(52) U.S. Cl.
CPC .......... *B01D 3/346* (2013.01); *B01D 1/0064* (2013.01); *B01D 3/42* (2013.01); *B01D 5/006* (2013.01); *B01D 5/0036* (2013.01); *B01D 5/0054* (2013.01); *G01N 30/8658* (2013.01); *G01N 2030/025* (2013.01)

(58) Field of Classification Search
CPC ........ B01D 1/0064; B01D 3/346; B01D 3/42; B01D 5/0036; B01D 5/0054; B01D 5/006; G01N 30/8658; G01N 2030/025
See application file for complete search history.

(56) References Cited

U.S. PATENT DOCUMENTS

| | | | | |
|---|---|---|---|---|
| 6,423,235 | B1* | 7/2002 | Shimoi | B01D 19/0015 210/760 |
| 8,523,985 | B2* | 9/2013 | Govindan | B01D 5/003 96/242 |
| 10,617,974 | B2* | 4/2020 | Thomas | B01D 1/14 |
| 2005/0230238 | A1* | 10/2005 | Klausner | B01D 5/003 203/10 |
| 2006/0032935 | A1* | 2/2006 | Matsuura | B01D 3/006 239/9 |
| 2007/0128320 | A1* | 6/2007 | Kubota | B01J 20/103 426/231 |
| 2010/0314238 | A1* | 12/2010 | Frolov | B01D 5/0027 203/10 |
| 2018/0078874 | A1* | 3/2018 | Thomas | B01D 53/1418 |
| 2019/0352194 | A1* | 11/2019 | Thiers | C02F 1/265 |

* cited by examiner

*Primary Examiner* — Jonathan Miller
(74) *Attorney, Agent, or Firm* — Rosenberg, Klein & Lee (57) ABSTRACT

A separation system for separating constituents from a solution by utilizing a carrier gas and a separation method thereof are disclosed. The separation system includes an evaporator, a solution distribution unit connected to the evaporator for distributing the solution into the evaporator, and a gas distribution unit connected to the evaporator for distributing the carrier gas into the evaporator. The solution is countercurrent to the carrier gas and upon contact, at least one constituent of the solution is vaporized and separated from the solution.

20 Claims, 6 Drawing Sheets

SEPARATION SYSTEM AND METHOD THEREOF

REFERENCE TO RELATED APPLICATIONS

This non-provisional application claims priority under 35 U.S.C. § 119(e) to U.S. Provisional Patent Application No. 62/749,597, filed Oct. 23, 2018, the entire contents of which are incorporated herein by reference.

FIELD OF THE INVENTION

The invention relates to a separation system and a separation method thereof, more particularly, to a separation system and a separation method thereof that utilize an externally pressurized carrier gas to separate constituents from a solution.

BACKGROUND

Plant extracts such as resins and oils contain chemical compositions that are useful in many fields including cosmetics, aromatherapy, pharmaceutical, medicine, and more. However, some chemical compounds in the resins extracted from plants are volatile and sensitive to temperature, and the use of separation methods at elevated temperatures can result in chemical changes.

Currently there are three state of the art distillation methods for separating volatile constituents: spinning band, wiped film, and short path, which are variances on the classic distillation column used on very volatile constituents.

The short path method is applicable to resins due to its better separation of constituents with high boiling point; it is similar to putting a condenser on a pot of boiling water. While this method allows for some separation of various cannabinoids and other compounds, it is far from most effective. Many undesirable compounds can be carried along with the vapors over into the collection vessel, contaminating the final product. Additionally, achieving high purity would require multiple runs to achieve purities in the 90% range and decarboxylation is most often required before use. Plus, the throughput is low, approximately 200-700 mL per hour.

The wiped film utilizes an inner condenser and a warmed outer cylinder on which crude oil is wiped across. The molecules that are at their boiling temperature then make a short jump across the gap to be condensed. One of the drawbacks to this method is that you cannot have any solvent or other volatile molecules in your crude. These lower boiling point compounds can violently boil, weaken the vacuum level and contaminate the product system. The crude oil must also be decarboxylated for the same reasons. The wiped film blades used to spread the material across the heated surface must be cleaned regularly or replaced. Wiped film also requires multiple passes to reach the 90% cannabinoids range and has a throughput of up to 1 L per hour.

The spinning band distillation places a helically shaped "band" located in the center of the column to help separate compounds, even those with close boiling points. As the material in the pot flask boils and vapors begin to make their way up the column, the spinning band forces the less volatile vapors back down into the pot flask. The band also creates a large amount of vapor-liquid contact thereby increasing purity. Spinning band allows for solvent to be left in the crude oil placed into the pot flask. Most solvents have a much lower boiling point than the first material to be recovered. Following the solvent fraction, terpenes are recovered. During the solvent and terpene recovery steps, the unit will decarboxylate the cannabinoid acids in the pot flask and thus making a smooth transition from these fractions to the desired fractions. Although spinning band reaches a high 90% purity in a single pass and its cleaning only requires a quick ethanol rinse, throughput of up to 1 L per hour is still quite low.

SUMMARY

An object of the invention is to provide a process for separating constituents from plant extracted resins utilizing externally pressurized inert gas injected into a system where the constituents are dispersed in a column and they are separated by weight and evaporation point in multiple condenser vessels. The process is performed continuously with minimal heat to the starting material and its constituents.

Therefore, it is an object of the invention to provide a separation system for separating constituents from a solution by utilizing a carrier gas. The separation system includes an evaporator, a solution distribution unit connected or fluidly connected to the evaporator for distributing the solution into the evaporator, and a gas distribution unit connected or fluidly connected to the evaporator for distributing the carrier gas into the evaporator. A flow of the solution is in countercurrent to a flow of the carrier gas and upon contact, at least one constituent of the solution is vaporized and separated from the solution.

In one embodiment of the invention, the separation system further includes a solution collection vessel connected/fluidly connected to the evaporator for collecting the remaining solution, and at least one condensation unit connected/fluidly connected in series to the evaporator for condensing the at least one vaporized constituent.

In one embodiment of the invention, the condensation unit includes a condenser, a collection unit, and a heater/cooler unit. The condenser is connected/fluidly connected to the evaporator or a previous condensation unit, and after receiving the carrier gas containing the at least one vaporized constituent from the evaporator or the previous condensation unit, condenses at least one of the at least one vaporized constituent contained in the carrier gas. The collection unit is connected/fluidly connected to the condenser for collecting the at least one condensed constituent and discharging the remaining carrier gas to a next condensation unit. The heater/cooler unit is configured to control a temperature of the condenser.

In one embodiment of the invention, the collection unit includes a separation vessel and a constituent collection vessel connected/fluidly connected to the separation vessel. The separation vessel is configured for the at least one condensed constituent to flow therethrough and for the remaining carrier gas to be discharged from the top thereof. The constituent collection vessel collects the at least one condensed constituent flown down from the separation vessel.

In one embodiment of the invention, the remaining carrier gas from a last condensation unit is discharged to the gas distribution unit, and the gas distribution unit includes a blower for receiving the remaining carrier gas and recycling the remaining carrier gas as the carrier gas being distributed into the evaporator.

In one embodiment of the invention, the evaporator includes a body filled with an inert material, a heating jacket covered with thermal insulation and disposed around the body, and a heater/cooler unit connected to the heating jacket for controlling the heating jacket. In addition, the solution is distributed in small droplets and the inert material in the body is glass beads.

In one embodiment of the invention, the solution distribution unit includes a nozzle for distributing the solution, a solution heater for heating the solution to a set solution temperature, and a solution thermostat connected to the solution heater for controlling the solution heater. The gas distribution unit includes a nozzle for distributing the carrier gas, a gas heater for heating the carrier gas to a set gas temperature, and a gas thermostat connected to the gas heater for controlling the gas heater.

In one embodiment of the invention, the separation system further includes a solution vessel connected/fluidly connected to the solution distribution unit for storing the solution therein, and a carrier gas source configured to provide the carrier gas. The solution vessel discharges the solution by pressurized carrier gas provided by the carrier gas source. The separation system also includes a vacuum pump configured to evacuate air from the separation system.

It is another object of the invention to provide a separation method for separating constituents from a solution by utilizing a carrier gas. The separation method includes the steps of: distributing the solution into an evaporator, and distributing the carrier gas into the evaporator, wherein a flow of the solution is in countercurrent to a flow of the carrier gas and upon contact, at least one constituent vaporizes and separates from the solution.

In one embodiment of the invention, the separation method further includes the steps of: collecting the remaining solution in a solution collection vessel, directing the carrier gas containing the at least one vaporized constituent to a condenser, condensing at least one of the at least one vaporized constituent contained in the carrier gas, and collecting the at least one condensed constituent in a collection unit.

In one embodiment of the invention, the separation method further includes the steps of: directing the remaining carrier gas to a next condenser for condensing at least one of the remaining vaporized constituent or to a gas distribution unit for recycling the remaining carrier gas as the carrier gas to be distributed in the evaporator.

In one embodiment of the invention, the separation method further includes the steps of: heating the solution to a set solution temperature before distributing the solution into the evaporator and heating the carrier gas to a set gas temperature before distributing the carrier gas into the evaporator.

In one embodiment of the invention, the separation method further includes the steps of: before distributing the solution or the carrier gas into the evaporator, performing a gas chromatograph analysis, defining a target number of constituents, performing a calculation for the behavior of the constituents, and programming the parameters in the aforementioned separation system. In addition, after the constituents are separated from the solution, a second chromatographic analysis is performed and the steps after performing a gas chromatograph analysis are repeated to obtain a higher precision.

In one embodiment of the invention, wherein before distributing the solution or the carrier gas into the evaporator, the separation method further includes the steps of: evacuating air from the evaporator, the condenser, the solution collection vessel and the collection unit; and filling the evaporator, the condenser, the solution collection vessel, and the collection unit with the carrier gas.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
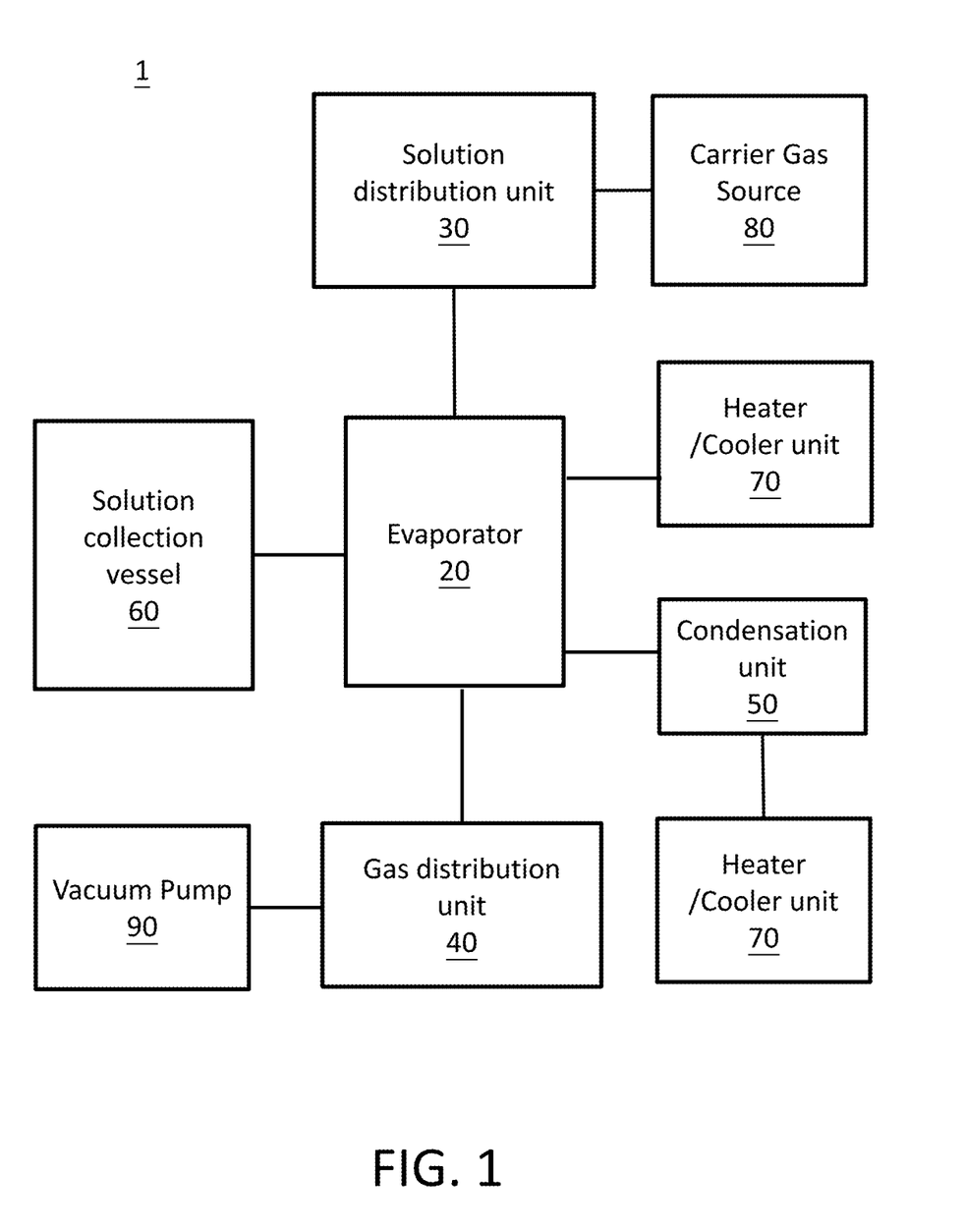
FIG. 1 is a block diagram of a separation system according to an embodiment of the invention.

FIG. 1 is a block diagram of a separation system 1 according to a preferred embodiment of the invention. The separation system 1 includes an evaporator 20, and a solution distribution unit 30, a gas distribution unit 40, at least one condensation unit 50, and a solution collection vessel 60 that are all connected to, or in fluid communication with the evaporator 20. The solution distribution unit 30 distributes a solution into the evaporator 20, wherein the solution is a liquid mixture of volatile compounds. The gas distribution unit 40 distributes a carrier gas into the evaporator 20, wherein the carrier gas is an inert gas like nitrogen or a gas that does not chemically react with the solution. In the evaporator 20, the solution and the carrier gas flow in countercurrent to each other, and upon contact, at least one constituent of the solution is vaporized and separated from the solution. The carrier gas containing the at least one vaporized constituent is directed to the at least one condensation unit 50 while the solution remaining in the evaporator flows to the solution collection vessel 60. At least one of the at least one vaporized constituents is condensed in the at least one condensation unit 50 to separate from the carrier gas and thus the at least one condensed constituent is collected.

In one embodiment, the separation system further includes a carrier gas source connected to the solution distribution unit 30, a heater/cooler unit 70 connected to each of the evaporator 20 and the condensation unit 50, and a vacuum pump in connection with the evaporator 20, the solution distribution unit 30, the condensation unit 50, or the gas distribution unit 40.

Figure 2:
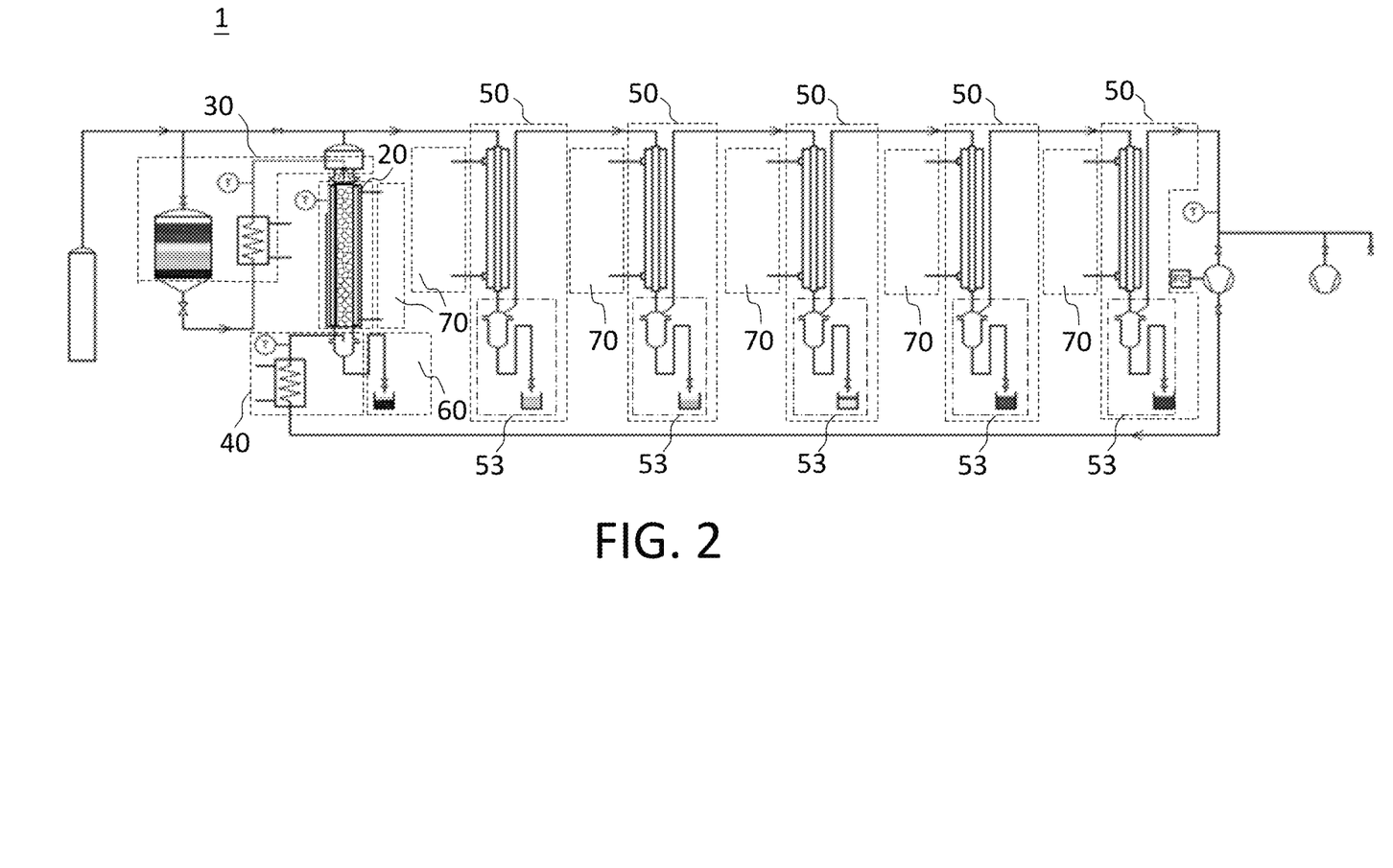
FIG. 2 is a schematic diagram of a separation system according to an embodiment of the invention.
Figure 3A:
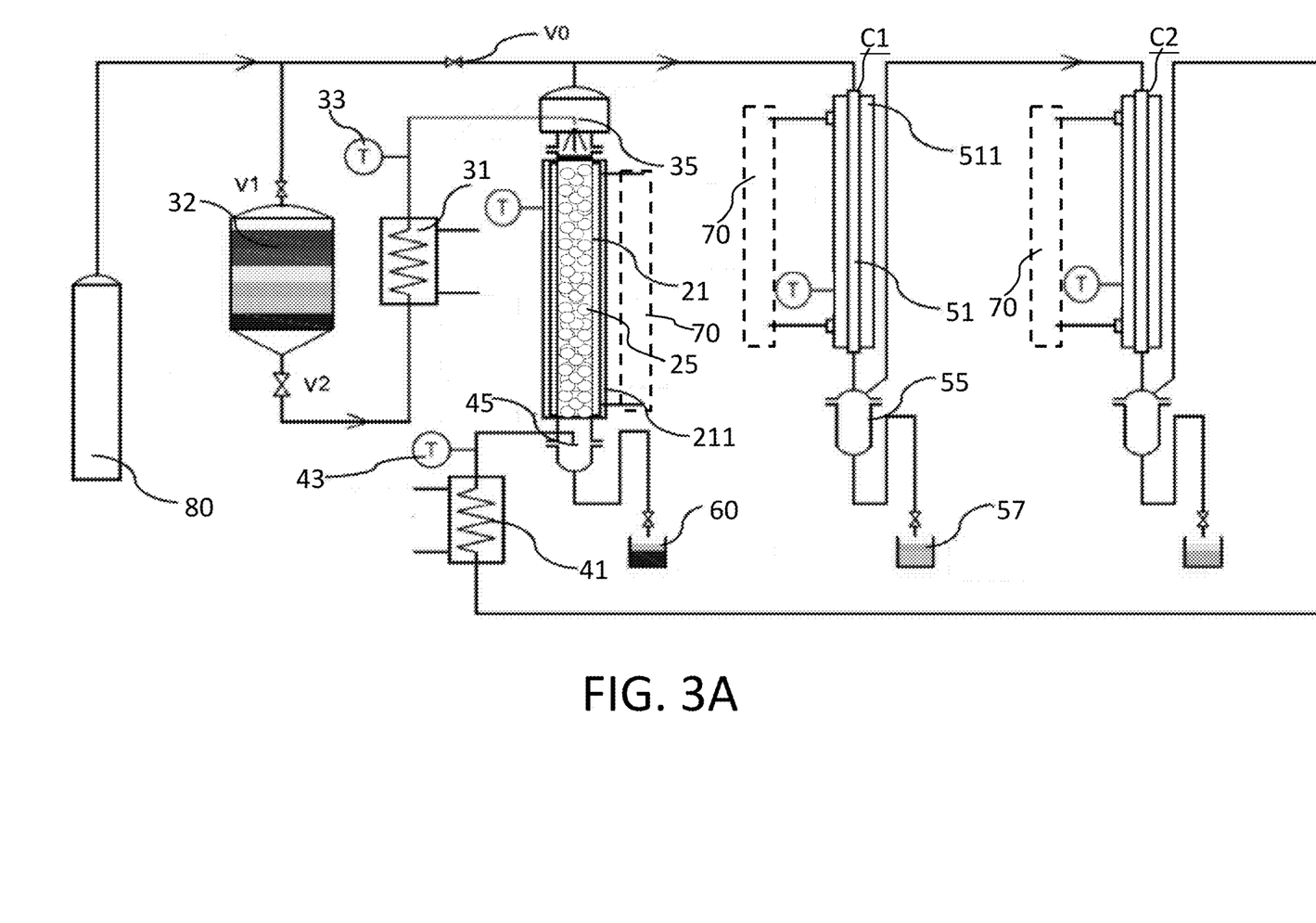
FIG. 3A is a schematic sectional view of the separation system in FIG. 2.
Figure 3B:
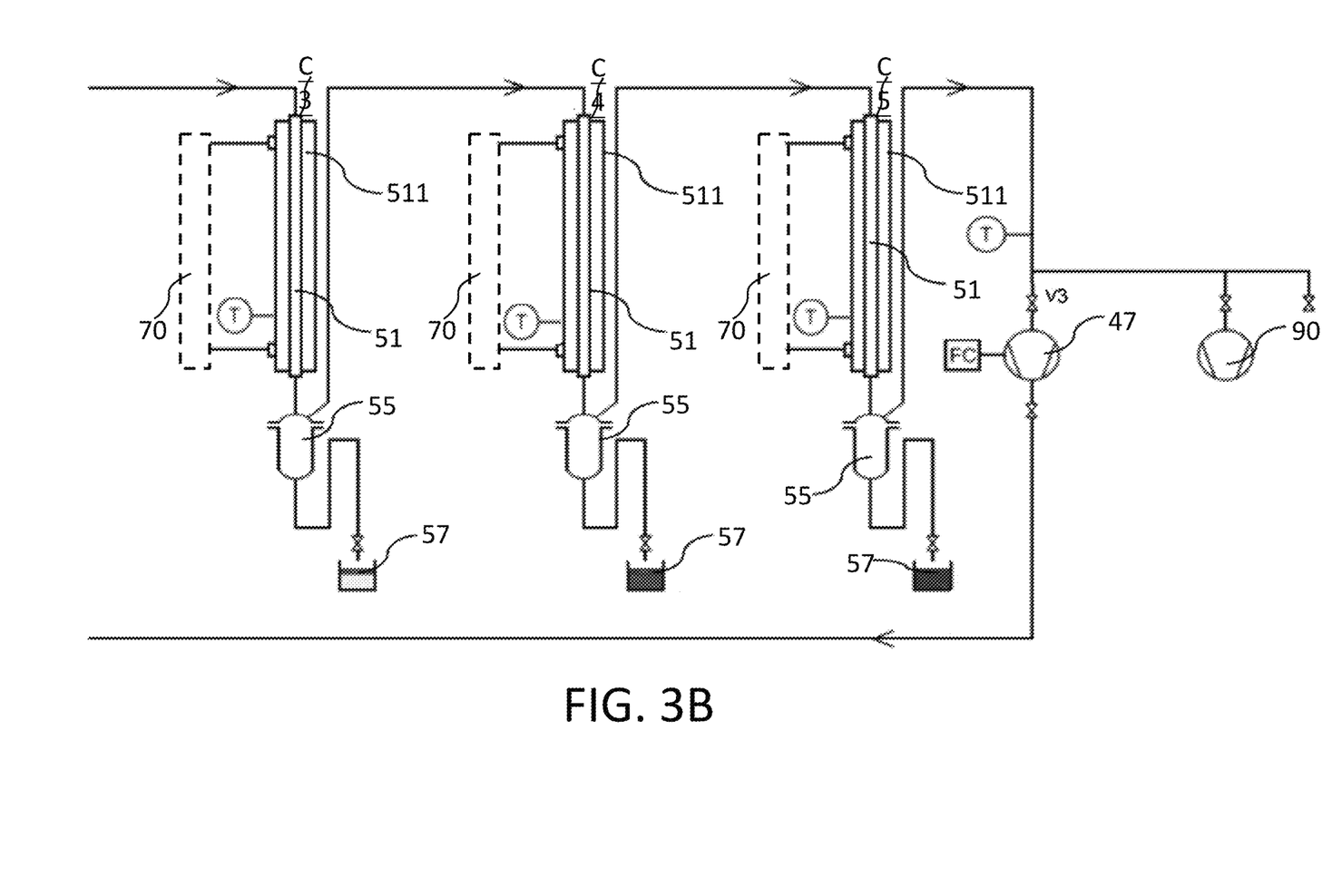
FIG. 3B is a schematic sectional view of the separation system in FIG. 2.

Referring to FIGS. 2, 3A and 3B, a separation system according to an embodiment of the invention is schematically depicted. The solution distribution unit 30 includes a solution heater 31 and a solution thermostat 33, wherein the solution is heated to a set solution temperature by the solution heater 31 controlled via the solution thermostat 33. The heated solution is then fed into the evaporator 20 of the separation system 1 in which atmospheric pressure is maintained via a carrier gas environment, for example, a dry nitrogen environment. The solution proceeds first in the evaporator 20. The evaporator 20 includes a body 21 filled with inert material 25, such as glass beads, and has a heating jacket 211 disposed around, on the outside, of the body 21 and covered with thermal insulation, wherein the body 21 is a vertical column and the heating jacket 211 is thermally controlled to a fixed temperature by a separate circulation thermostat (not shown) that controls the heater/cooler unit 70 with capability for heating and cooling to set temperature.

The solution is sprayed through a solution nozzle 35 of the solution distribution unit 30 onto the beads and flows down gravitationally in the evaporator 20, such that the solution distributed into the evaporator 20 is in a form of small droplets. In countercurrent, a preheated carrier gas is fed through a gas nozzle 45 of the gas distribution unit 40 to the evaporator 20; the preheated carrier gas could be a preheated dry nitrogen flow and the solution and the carrier gas could be fed respectively from the top and the bottom of the evaporator 20 but the invention is not limited thereby. A gas heater 41 and a gas thermostat 43 of the gas distribution unit 40 are used to heat the carrier gas to a strictly defined set gas temperature. In the evaporator 20, the carrier gas (nitrogen) stream is in contact with the solution, and by immediate evaporation, the vapors of certain expected components evaporate from the solution at the set temperature.

It is to be noted that what exact components will evaporate from the solution depends on the mass flow, the gas (nitrogen) temperature, the solution temperature, and the heat in the evaporator jacket. High-boiling and high-concentration components cannot evaporate from the solution/solvent and will stay in the evaporator with the rest of the solution.

The solution remaining in the evaporator 20 is discharged to a solution collection vessel 60; for example, the remaining solution that stayed in the evaporator 20 flows through the bottom thereof and is drained via a hydraulic device from a separation vessel (not shown) into the collection vessel 60. The remaining solution collected in the collection vessel 60 is the first collected fraction of the solution.

The carrier/inert gas stream with vapors containing certain components of the solution is discharged from the evaporator 20, preferably from the top thereof. Therefore, the first level of separation of the individual components is achieved by evaporation in the evaporator 20.

The vapor-gas mixture, or the carrier gas containing the vaporized constituent, is then fed sequentially into the at least one condensation unit 50. The at least one condensation unit 50 is connected in series to the evaporator 20 and each condensation unit 50 includes a condenser 51, and a collection unit 53 which has a separation vessel 55 and a constituent collection vessel 57, wherein the separation vessel 55 is connected to or in fluid communication with the condenser 51 and the constituent collection vessel 57 is connected to or in fluid communication with the separation vessel 55. The condenser 51 is a vertical pipe with a cooling jacket 511 and thermal insulation (not shown). In one embodiment, the condensation unit 50 further includes the heater/cooler unit 70 acting as a precise heating and cooling system and a thermostat connected to the condenser 51, wherein in each individual condenser 51, a strictly specified cooling medium temperature is controlled and maintained by the heater/cooler unit 70 which is a separate thermostatic system operating in a heating and cooling mode.

The separation system 1 shown in FIG. 2 has five condensation units, but it is merely for illustration purpose and the number of condensation units in the invention is not limited thereby. The controlled heating/cooling temperature decreases from the first condenser C1 to the last condenser C5, for example, from about 90° C. to about −20° C. This allows the condensers 51 to liquefy the vapor of components with high dew point to those with lower dew point. By strictly regulating the temperatures of the cooling medium in each condenser 51, liquefaction and separation of certain components from the vapor-gas mixture are achieved. In each condenser 51, the mixture of carrier gas and vapors is fed into the top, passing through the heat exchange surface of the cooling jacket 511, whereby the vapors of some of the components are liquefied by cooling.

The condensed components/constituents formed in each condenser 51 flow through the respective separation vessel 55, which is preferably located in the lower part of the condenser 51 and drained down into the respective constituent collection vessel 57. The vapor-gas mixture with altered chemical composition, or the remaining carrier gas with the remaining at least one vaporized constituent, leaves the separation vessel 55 and is fed to the next condenser 51. In one embodiment, the remaining carrier gas is discharged from the top of the separation vessel 55 into the top of the next condenser 51. Thus, in the five condensers C1-C5, a complete liquefaction of the entire vapor phase is achieved.

The remaining carrier gas, or the inert non-condensed nitrogen, from the last condenser C5 is recirculated by a blower 47 of the gas distribution unit 40 with a frequency controller and capability to control the flow rate, wherein the remaining carrier gas is injected into the gas heater 41 for reheating and repetitive use in the evaporator 20. In one embodiment, the gas distribution unit 40 further includes a filter (not shown) configured to filter the recirculated carrier/inert gas before reheating. The whole separation system 1 should be well thermally insulated to avoid undesired condensation from the vapor of the individual components (not shown).

In other words, the carrier gas containing the at least one vaporized constituent is first discharged from the evaporator 20 to the condensation unit 50 connected thereto for condensing at least one of the at least one vaporized constituent contained in the carrier gas. Then, the remaining carrier gas is discharged to a next condensation unit 50. The next condensation unit 50 receives the remaining carrier gas from the previous condensation unit 50 and condenses at least one of the remaining at least one vaporized constituent contained in the remaining carrier gas, and so on. The remaining carrier gas discharged from the last condensation unit 50 is directed to the gas distribution unit 40 wherein it is recycled as the carrier gas distributed into the evaporator 20.

In one embodiment, the solution acts as a starting solution and is placed in a solution vessel 32, part of the solution distribution unit 30, wherein the starting solution is fed to the evaporator 20 by pressure created by the carrier gas. The carrier gas is provided by the carrier gas source 80, which could be an inert gas stored in a pressurized cylinder/bottle or delivered by a pump (not shown). In addition, the vacuum pump 90 is disposed in the separation system 1 and configured to evacuate air therein. In one embodiment, the vacuum pump 90 is in connection to at least one of the evaporator 20, the solution distribution unit 30, the condensation unit 50 or the gas distribution unit 40.

The separation system 1 operates in continuous mode until the starting solution is depleted. The use of inert gas, such as nitrogen, to be the carrier gas prevents the target constituent from oxidation, hydrolysis and other unwanted processes. The separation system needs to be free of air before processing and the use of the vacuum pump is needed before each cycle.

To operate the separation system, one would proceed as follow:
1. Add a starting solution;
2. Close valves V2, V3 and open valves V0, V1;
3. Use the vacuum pump to evacuate the air from the separation system to the maximum possible vacuum;
4. Fill the separation system with dry nitrogen from a pressurized bottle or an inert gas source to atmospheric pressure by opening the valve at the carrier gas source 80;
5. Close valve V0 and open valves V1, V2, and V3;
6. Set the process temperature in all vessels at all heater/cooler units 70 and start the separation process; and
7. Run the blower 47 at a flow rate.

The continuous design of the separation system of the invention allows each of the collected and separated fractions/constituents to be run as a starting solution and separated again (stage separation). Take the system design shown in FIG. 2 for separating a starting solution as an example. Assuming that the evaporation system 1 is evacuated from air and the solution is running, as example, at a flow rate of 20 L/h, the pressure from the carrier gas source 80, in this case a nitrogen tank, will push the solution via valve V1. The solution will flow via valve V2 and be preheated with the solution heater 31 to a set solution temperature anywhere between 40° C. to 140° C.

Figure 4:
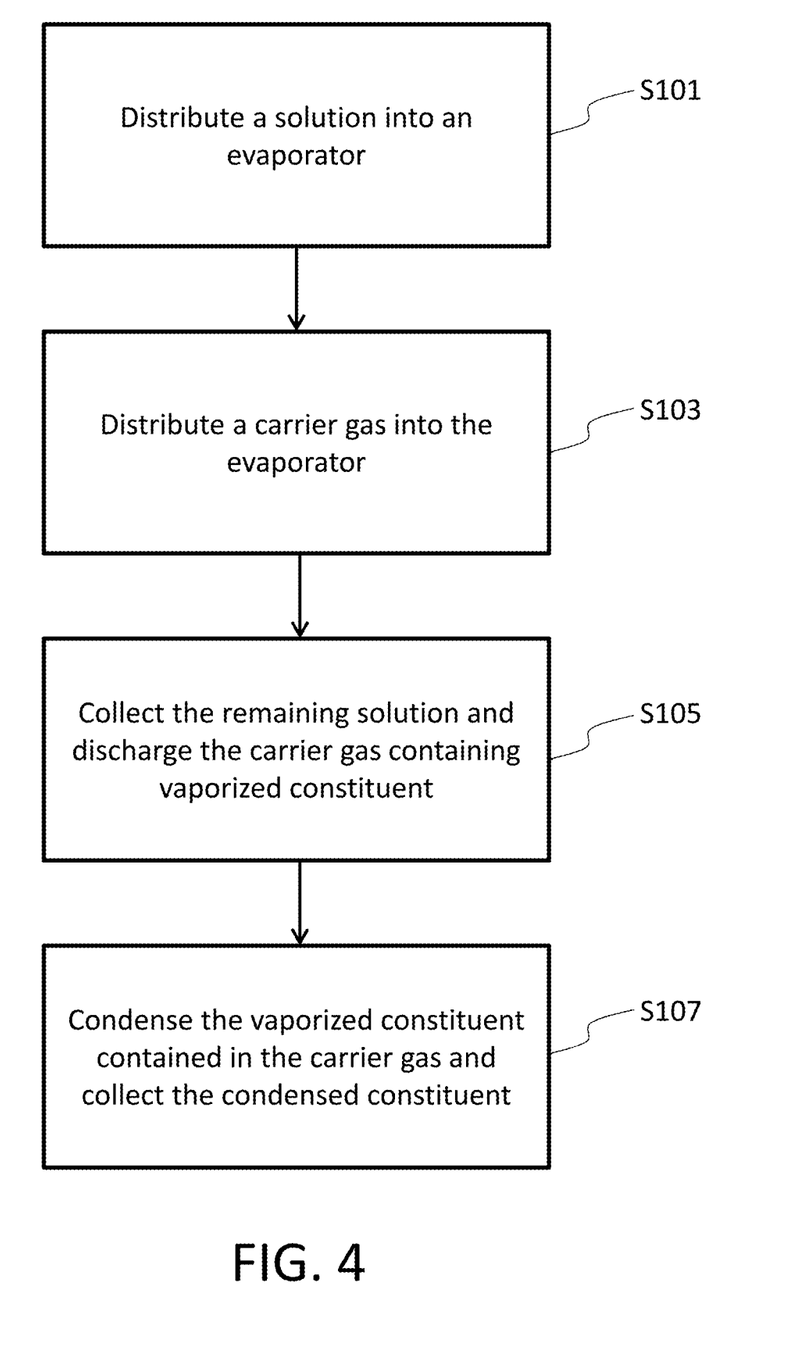
FIG. 4 is a flow chart of a separation method according to an embodiment of the invention.

FIG. 4 is a flow chart illustrating a separation method according to an embodiment of the invention. First step is to distribute the solution into an evaporator S101. The solution will be distributed and sprayed via the solution nozzle 35 into the evaporator 20 that is preheated to around 40° C. to 140° C. In S103, distribute the carrier gas into the evaporator. A countercurrent of preheated inert gas at around 40° C. to 140° C. that is distributed and sprayed via the gas nozzle 45 will evaporate and carry up the constituents with boiling point lower than the temperature of the inert gas. The constituents with higher boiling point will remain in the solution and the remaining solution flows down to the separation vessel and the solution collection vessel 60. Subsequently the step of collecting the remaining solution in a solution collection vessel and directing the carrier gas containing at least one vaporized constituent to a condensation unit is performed S105.

Then, in step S107, condense the vaporized constituent and collect the condensed constituent. The carrier gas containing vaporized constituents will be discharged at, as example, a flow rate of 0-5 L/h and enter the first condenser C1 where the temperature will be set at around 30° C. to 90° C. After passing through the condenser C1, the vaporized constituents whose boiling point is below the condenser temperature will remain vaporized and leave the separation vessel 55 with the carrier gas, whereas those with higher boiling point will be condensed and separated from the carrier gas, and the condensed constituents will flow down to the separation vessel 55 and into the constituent collection vessel 57. Hence, the condensed constituent collected in the constituent collection vessel 57 is the next more volatile collected fraction of the solution, in other words, the volatility of the condensed constituent collected in the constituent collection vessel 57 is higher than that in a previous constituent collection vessel.

The process will repeat over and over by separating the constituents by volatility. The next condenser C2 is set to 30° C. to 60° C., the next C3 is set to 30° C., the next C4 to 0° C. to −10° C., and the last C5 to 0° C. to −20° C. No volatile constituent will be expected to remain mixed with the carrier/inert gas, in this case nitrogen, after passing through the last condenser C5 because the boiling point of the inert gas is expected to be about −200° C. The blower 47 recirculates the nitrogen back to the gas distribution unit 40 by carefully adjusted flow control to match the evaporation rate.

Figure 5:
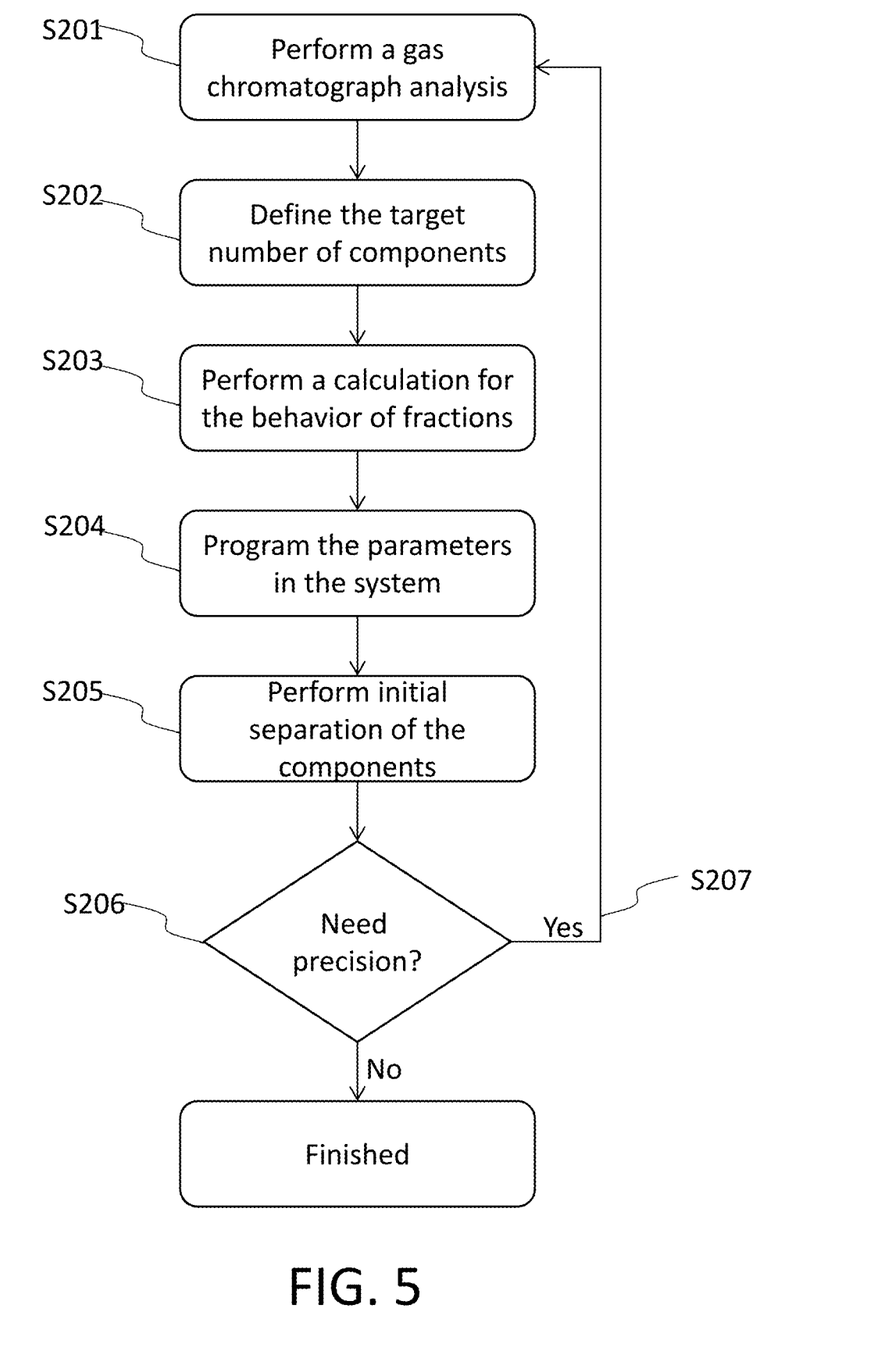
FIG. 5 is a flow chart of a separation method according to an embodiment of the invention.

FIG. 5 is a flow chart illustrating a separation process according to another embodiment of the invention, wherein the system utilizes the following method for separation:
S201. Perform a gas chromatographic analysis of the starting solution to obtain results showing its components and mass concentrations.
S202. Define the target X number of components or constituents or fractions corresponding to the X number of constituent collection vessels that will be isolated from the solution.
S203. Perform a calculation for the behavior of the X fractions to determine the optimal separating parameters, including temperatures of the heating media, carrier gas, starting solution, evaporator jacket, cooling media in the condensers and the flow rates of the carrier gas, starting solution, and separation system.
S204. Program the parameters in the separation system to ensure proper control of the environment for executing the separation method.
S205. Perform initial separation of the components from the solution (single or multi-stage) by collecting the individual fractions.
S206. Gas chromatographic analysis of the target fractions is carried out to determine their purity and the adequacy of the created model.
S207. If needed, calculate any sub fractions and rerun to separate the component into sub components. Or else, end the separation process.

In view of the above, the invention provides a continuous gas/liquid separation system and method, which may even be applied for gas/solid extraction. In comparison to the conventional liquid/liquid separation system and methods, the separation system and method of the invention carries out the separation of components with minimal heat on both the starting material and the constituents and each separated component or remained material can be introduced into the system for further separation.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A separation system for separating constituents from a solution by utilizing a carrier gas, the separation system comprising:
   an evaporator;
   a liquid solution distribution unit fluidly connected to the evaporator for distributing the solution into the evaporator; and
   a gas distribution unit fluidly connected to the evaporator for distributing the carrier gas into the evaporator;
   wherein the liquid solution distribution unit and the gas distribution unit are disposed and configured such that a flow of the solution into the evaporator is in countercurrent to a flow of the carrier gas into the evaporator, and upon contact between the solution and carrier gas in the evaporator, at least one constituent of the solution is vaporized and separated from the solution; and
   wherein the solution is a liquid solution including plant extracted resins.

2. The separation system of claim 1, further comprising:
a solution collection vessel fluidly connected to the evaporator for collecting the solution remaining in the evaporator; and
at least one condensation unit connected to the evaporator for condensing the at least one vaporized constituent.

3. The separation system of claim 2, comprising at least two condensation units connected in series to the evaporator, wherein the at least two condensation units include a first condensation unit and a second condensation unit, the first condensation unit comprising:
a condenser fluidly connected to the evaporator or a previous condensation unit, wherein the condenser receives the carrier gas containing the at least one vaporized constituent from the evaporator or the previous condensation unit and condenses at least one of the at least one vaporized constituent contained in the carrier gas; and
a collection unit fluidly connected to the condenser, wherein the collection unit collects the at least one condensed constituent and discharges the carrier gas remaining in the condenser to the second condensation unit.

4. The separation system of claim 3, wherein the collection unit comprises:
a separation vessel fluidly connected to the condenser for the at least one condensed constituent to flow therethrough and for the remaining carrier gas to be discharged from the top thereof; and
a constituent collection vessel fluidly connected to the separation vessel for collecting the at least one condensed constituent flowed down from the separation vessel.

5. The separation system of claim 3, wherein the remaining carrier gas from a last condensation unit is discharged to the gas distribution unit.

6. The separation system of claim 5, wherein the gas distribution unit comprises a blower for receiving the remaining carrier gas from the last condensation unit and recycling the remaining carrier gas as the carrier gas being distributed in the evaporator.

7. The separation system of claim 2, wherein each of the at least one condensation unit further comprises a heater and/or a cooler connected to the condenser to control a temperature of the condenser.

8. The separation system of claim 1, wherein the evaporator comprises a body filled with an inert material, a heating jacket covered with thermal insulation and disposed around the body, a heater and/or a cooler connected to the heating jacket for heating or cooling the heating jacket.

9. The separation system of claim 8, wherein the solution is distributed in small droplets, the inert material in the body is glass beads, the liquid solution distribution unit and the gas distribution unit each comprises a nozzle for distributing the solution and the carrier gas respectively.

10. The separation system of claim 1, wherein the liquid solution distribution unit comprises a solution heater for heating the solution to a set solution temperature and a solution thermostat connected to the solution heater for controlling the solution heater, and the gas distribution unit comprises a gas heater for heating the carrier gas to a set gas temperature and a gas thermostat connected to the gas heater for controlling the gas heater.

11. The separation system of claim 1, further comprising:
a solution vessel fluidly connected to the liquid solution distribution unit for storing the solution therein; and
a carrier gas source fluidly connected to the solution vessel for providing the carrier gas to the solution vessel.

12. The separation system of claim 11, wherein the solution vessel discharges the solution by pressurized carrier gas provided by the carrier gas source.

13. The separation system of claim 1, further comprising a vacuum pump in connection to at least one of the evaporator, the liquid solution distribution unit, or the gas distribution unit to evacuate air in the separation system.

14. A separation method of a separation system for separating constituents from a solution by utilizing a carrier gas as described in claim 1, the method comprising:
distributing the solution, by the solution distribution unit, into the evaporator; and
distributing the carrier gas, by the gas distribution unit, into the evaporator;
wherein the solution and the carrier gas are distributed such that a flow of the solution into the evaporator is in countercurrent to a flow of the carrier gas into the evaporator, and upon contact between the solution and carrier gas in the evaporator, at least one constituent vaporizes and separates from the solution, and
wherein the solution is a liquid solution including plant extracted resins.

15. The separation method of claim 14, further comprising:
collecting the solution remaining in the evaporator with a solution collection vessel;
directing the carrier gas containing the at least one vaporized constituent to a condenser;
condensing at least one of the at least one vaporized constituent with the condenser; and
collecting the at least one condensed constituent into a collection unit.

16. The separation method of claim 15, further comprising:
directing the carrier gas remaining in the condenser to a next condenser for condensing at least one of the vaporized constituent remaining in the remaining carrier gas or to a gas distribution unit for recycling the remaining carrier gas as the carrier gas to be distributed in the evaporator.

17. The separation method of claim 14, further comprising:
heating the solution to a set solution temperature before distributing the solution into the evaporator; and
heating the carrier gas to a set gas temperature before distributing the carrier gas into the evaporator.

18. The separation method of claim 14, wherein before distributing the solution or the carrier gas into the evaporator, the separation method further comprises:
performing a gas chromatograph analysis of the solution;
defining a target number of constituents;
performing a calculation for the behavior of the constituents; and
programing system parameters for executing the separation method.

19. The separation method of claim 18, wherein after the constituents are separated from the solution, a second chromatographic analysis of the solution is performed.

20. The separation method of claim 15, wherein before distributing the solution or the carrier gas into the evaporator, the method further comprises:

evacuating air from the evaporator, the condenser, the solution collection vessel and the collection unit; and filling the evaporator, the condenser, the solution collection vessel, and the collection unit with the carrier gas.

\* \* \* \* \*